Sheet 1 - 2 Sheets.
7777X
L. Kidder,
Street Sweeper,
Patented Sep. 20, 1833.
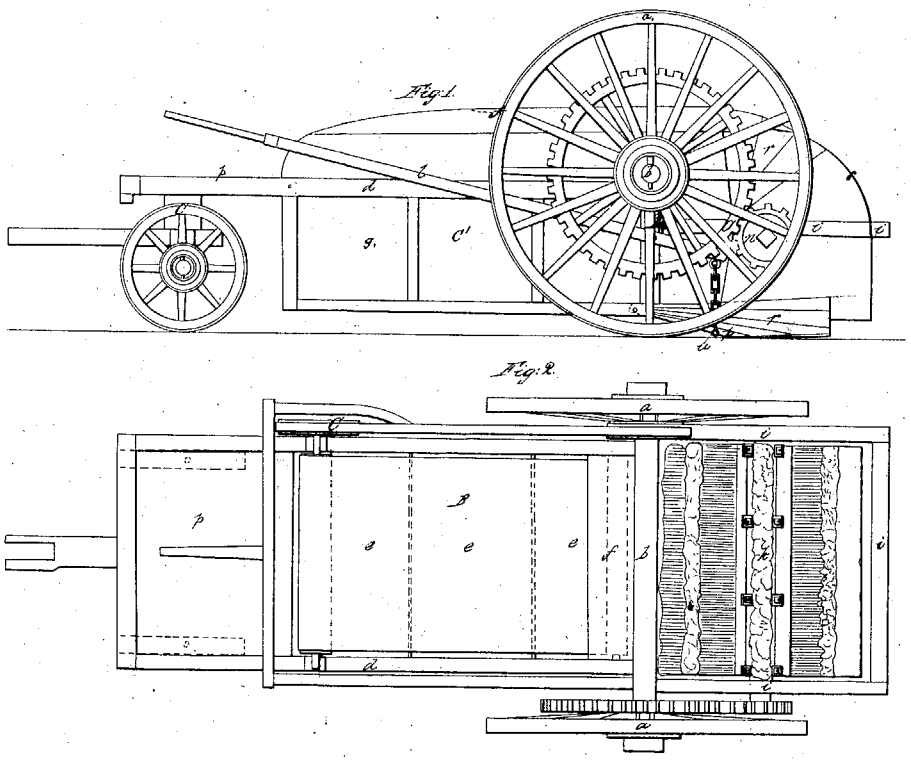

7777X
L. Kidder,
Street Sweeper,
Patented Sep: 20, 1833.
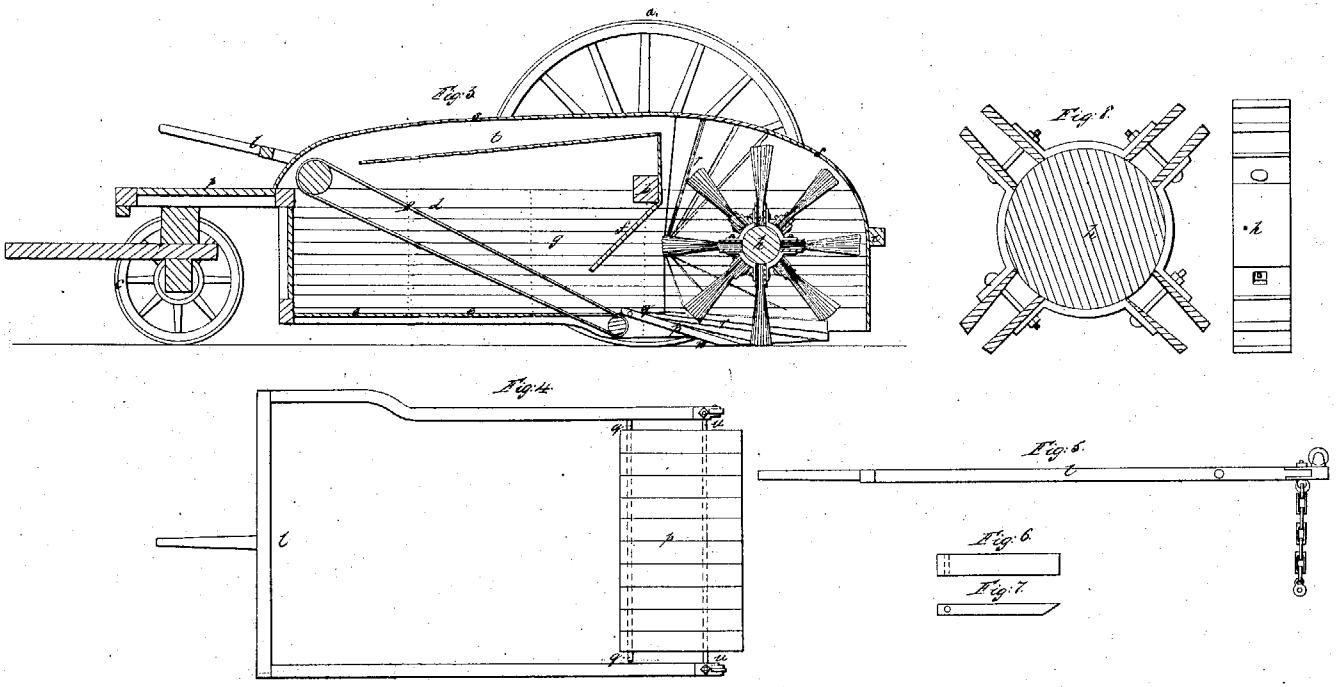

77777X Sept. 20 1833 Sept 20, 1833 273.

Levi Kidder of New York City
Letters Patent

The Schedule referred to in these Letters Patent and making part of
the same containing a description in the words of the said Levi
Kidder himself of his improvement being a <u>Machine for sweep
ing Streets</u> and at the same time removing the dirt, To all to whom these presents shall come. Be it known that
I Levi Kidder of the City County and State of New York have inven
ted a new and useful improvement in a <u>machine for sweeping streets
and at the same time removing the dirt</u>, and that the following is a
full and exact description of the construction and operation of said
Machine as invented by me. 1st It consists of a wagon the
hind wheels of which being high for the purpose of giving elevation
to the body or dirt receiver are fastened to an iron axle which
turns with them. The fore wheels are proportionally low and
having a short axle they work beneath the frame or beams of
the wagon. This arrangement of the fore wheels is designed to
admit the wagon to make short turns. Upon the axles of these
wheels rests the wagon frame much in the manner of other wagons,
but unlike them, the receiver is built under instead of above
the beams, bringing it near the ground thereby requiring only
a small elevation for the dirt to be raised. for this purpose
the receiver is framed into the side beams on the under side
between the fore and hind axles as near the latter as other
parts of the machine will allow; and at such distance from the for-
mer as will admit the fore wheels in turning to pass without in
terfering. The bottom of the receiver is constructed of several trap
doors, filling the spaces between the cross beams of it. These
doors are contrived for the purpose of discharging the receiver
when loaded, the bottom being far enough from the ground
to answer this ~~[illegible]~~. The hind board inclines forward form
ing an angle of about 40 degrees making an inclined plane The side boards extend beyond the seat of the receiver in rear of the hind axle as far as the ~~shaft of~~ the broom will admit. said broom to be hereafter described.

2nd A revolving cylindrical broom resembling a water wheel and consisting of eight or any convenient number of combs of brush broom corn or any suitable substance made by weaving together the buts with cord or other means and fastening them to the broom shaft by placing them between beveled or wedge sha ped beams or planks which beams are fastened to the shaft by bolts which are fixed to collars on the shaft and passing thro the beams have on their upper ends screws on which nuts work forcing the beams to the centre and firmly wedging the combs. There are other ways of making the broom as by confining the the buts of the brush between the clamps by many bolts and fas tening them to iron heads fixed on the shaft near the ends. This broom is placed in a frame made of two strong arms, fas tened at their ends by cross pieces of sufficient length to admit the combs between the arms. The frame with the broom parallel to the hind axle and as near to it as will admit is attached to the wagon by fastening one end of each arm to the axle between the beam & nave by means of a hinge box keyed for the purpose of admitting the broom to be detach ed from the wagon at pleasure, and at the same time, admitting the arms to rise or fall at the opposite ends. which arrange- ment allows the broom to be elevated or depressed so as to press lightly or heavily upon the streets, or be raised from them en tirely as circumstances may require. And this is done by levers (it may be done by pulleys or other power) which levers one to each arm are fixed to the side wagon beams on the un der side by a kind of bolts which answer the purpose of fulcrums pla ced a little in the rear of the hind axle. The short ends of the levers with a caster on each work upon the under side of the broom arms. The long ends extend along the sides of the wagon as far as the front of the receiver and are fas-
tened by a cross piece into which is framed a boom or handle
and with this handle the driver who stands upon a plat-
form in front of the receiver controls the broom on one
end of the broom shaft outside of the arm is a pinion wheel
into which works a cog wheel that is fastened upon and turns
with the hind wagon axle by which wheels motion is given
to the broom reverse to the motion of the wagon wheels from
which the power is communicated. the broom making about
three revolutions to one of the wagon wheels. similar gear-
ing of reaping may be attached to both ends of the broom, or the same
motion may be given to it by means of cross bands or similar contri-
vance. 3^d An inclined plane or drag which is made in sec-
tions of many pieces of wood or any suitable substance the sec-
tions about the dimensions of two and a half feet long two inches
thick and three inches wide, all jointed and having the ends
designed to drag on the ground beveled on the under side to near-
ly sharpness, and the other ends being perforated the sections
are placed on an iron rod in such numbers as will together
make a plane as wide as the broom is long, and are designed to
work on the rod as a common centre of motion adapting themselves
to the inequalities of the ground or pavements any part of them
rising or falling without moving any of the others. The drag is
[illegible]
placed under the fore part of the broom, the other end is fastened
by the above named rod to the side boards of the receiver just
over the lower end of the plane made by the hind board, ~~these made~~
~~by the hind board~~ thus ~~making~~ forming from the ground under the
broom to the top of the receiver a continued plane which
~~is~~ designed as a way or passage for the dirt. Or an incli-
ned plane is made from the drag by a moving apron working
round a roller placed just under the upper end of the drag
and round another roller fixed on two posts raised above
the top of the receiver on the side beams. These rollers and

7777X consequently the aprons are turned by a band passing over a wheel on the end of the upper roller, and over another wheel on the hind axle where it receives its motion. The motion of the broom in turning sweeps the ground or pavements, and carrying the dirt along with it on" the drag sweeps a large portion of that also and gives the dirt an impulse which carries it beyond the drag up the inclined plane of the hind board into the receiver, or it carries the dirt on to the apron (or other elevator) which turning empties itself into the receiver. Thus sweeping and taking up the dirt at the same time The operation of taking up the dirt is greatly assisted by the air which is formed into a strong current by the motion of the broom which acts as a fanning mill. and for this purpose a channel is made from the broom by connecting the extreme sections of the drag with the extended sides of the receiver by means of a gore of leather or other matter. and making a covering from the broom over the drag. and the receiver. the broom is also covered. But that the air may pass from the receiver without producing dust in sweeping, a kind of flue is made conducting the air which is driven aft of the top of the receiver thro an opening for that purpose near the front back over the receiver cover to the broom thus forming a continued circuit. Across the under side of the drag runs an iron rod fastened to the extreme sections. which rod is confined by a small chain to the levers above described in such a manner as to raise the drag from the ground with the broom at pleasure, as when it is not necessary to sweep.

The whole machine is to be worked by horse or other power. The receiver being filled with dirt the broom is detached by means of the keyed box above mentioned and placed on another wagon while the loaded one is taken away to be discharged. What I claim as my invention is the adaptation of the cylindrical revolving broom to the purpose of sweep ing the streets and taking the dirt at the same time, by being attached to the wagon with ~~its~~ shaft parallel to the axes of the wheel or wheels by which it is moved, its revolving motion being the reverse of the revolving motion of said wheel or wheels, and being fixed on supporters in such manner that by mechanical or other power it may be elevated or depressed at pleasure so as to press heavily or lightly upon the streets or be raised from them entirely as circumstances may require, upon the principles herein before set forth. I also claim the drag formed in sections and moving as before described on a common centre so as to adapt itself to the inequalities of the streets or pavements, parts thereof rising or falling without affecting the rest, and designed as a way or passage for raising the dirt which it is so placed as to receive from the broom. and the advantage taken of the air in the manner above described, together with the adaptation of all the parts of the machine to the particular object of sweeping and of taking up and discharging dirt in the manner described above Exd
H.C.

Witnesses
Daniel French
John Flint

Levi Kidder (1788 Words)

(Granted September 20. 1833.)